US006275790B1

(12) United States Patent
Yamamoto et al.

(10) Patent No.: US 6,275,790 B1
(45) Date of Patent: Aug. 14, 2001

(54) INTROSPECTIVE EDITOR SYSTEM, PROGRAM, AND METHOD FOR SOFTWARE TRANSLATION

(75) Inventors: Keiichi Yamamoto; Kin Hung Yu; David Bruce Kumhyr, all of Austin, TX (US); Stanford Louis Yates, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/362,615

(22) Filed: Jul. 28, 1999

(51) Int. Cl.[7] .............................. G06F 17/20; G06F 3/00; G06F 9/45
(52) U.S. Cl. ................................... 704/8; 717/8; 345/334
(58) Field of Search ........................... 704/1, 8; 707/530, 707/536; 717/1, 4, 8; 345/333, 334

(56) References Cited

U.S. PATENT DOCUMENTS

| 5,251,130 | * | 10/1993 | Andrews et al. | 704/8 |
| 5,416,903 | * | 5/1995 | Malcolm | 345/333 |
| 5,583,761 | | 12/1996 | Chou | 395/798 |
| 5,652,884 | | 7/1997 | Palevich | 395/651 |
| 5,664,206 | * | 9/1997 | Murow et al. | 704/8 |
| 5,678,039 | | 10/1997 | Hinks et al. | 395/604 |
| 5,907,326 | * | 5/1999 | Atkin et al. | 345/334 |
| 5,953,526 | * | 9/1999 | Day et al. | 707/1 |
| 6,003,050 | * | 12/1999 | Silver et al. | 707/536 |

OTHER PUBLICATIONS

Kenton Lee, X Application Software Engineering: Debugging X Toolkit Resources with editres, The X–Journal, Nov. 1994.
John Akerley, Nina Li, Antonello Parlavecchia, Programming With Visual Age for Java Version 2, International Technical Support Organization, Nov. 1998.
Seperating Strings from Standard Graphical User Interface Resources for Translation and Builds, IBM Technical Disclosure Bulletin, vol. 39, No. 03, Mar. 1996, pp. 217–228.
Tool to Aid Translation of Web Pages Into Different National Languages, IBM Technical Disclosure Bulletin, vol. 41, No. 01, Jan. 1998, pp. 223–224.

* cited by examiner

Primary Examiner—Patrick N. Edouard
(74) Attorney, Agent, or Firm—Marilyn Smith Dawkins; Bracewell & Patterson, L.L.P.

(57) ABSTRACT

A system, method, and program for providing language translators with contextual information for the text to be translated. The translator is presented with a graphical user interface in the base language, and can then interactively translate each text label on the screen. Because the translation is performed on the text in the proper context, the time and expense of Translation Verification Testing is reduced or eliminated. The ability to edit the text within the application is achieved by adding an editor function to the software application itself. Each text label in the application is stored in a localization file with a specific resource bundle name and by a key. When the editor is activated, the text object is introspected for its source data, and the translator can edit the text directly. The source data is then used to store the translation for later use.

21 Claims, 9 Drawing Sheets

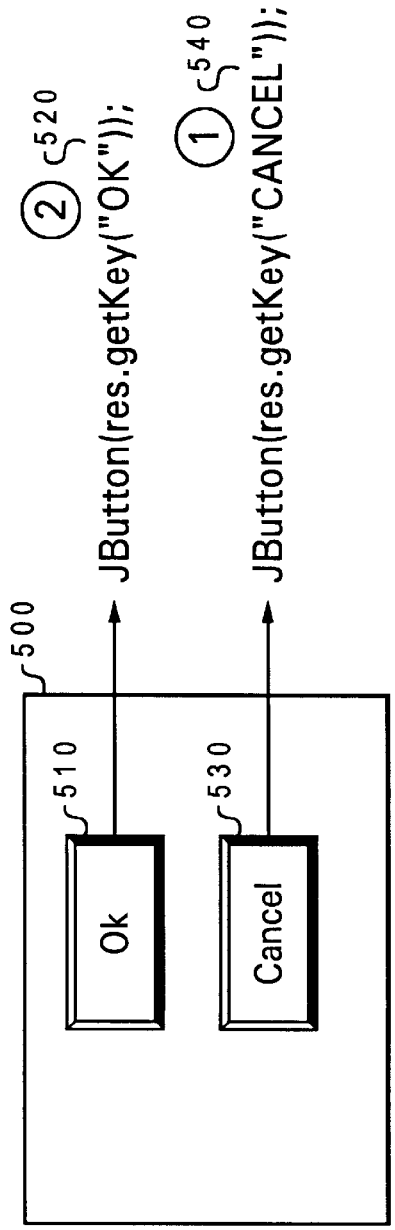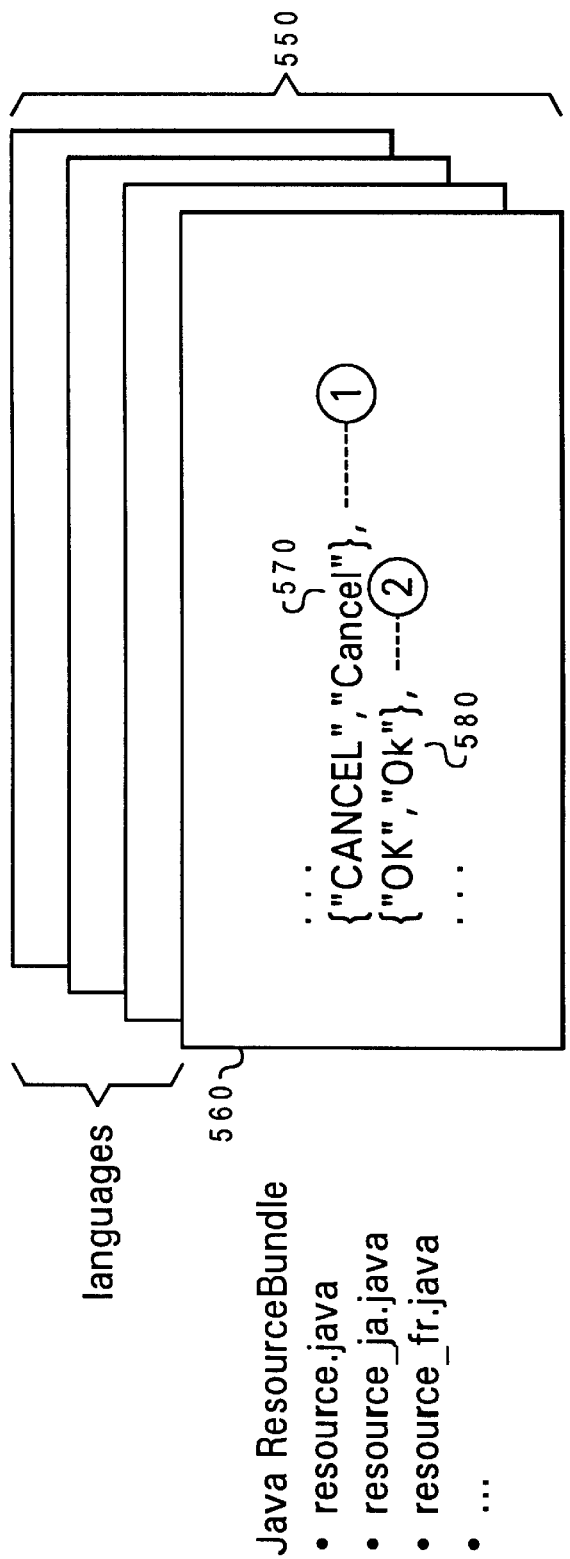
Fig. 5

INTROSPECTIVE EDITOR SYSTEM, PROGRAM, AND METHOD FOR SOFTWARE TRANSLATION

CROSS REFERENCE TO RELATED APPLICATIONS

This application shares common text and figures with commonly assigned, copending applications Ser. No. 09/362,616, "Introrespective Editor System. Program, and Method For Software Translation Using a Facade Class", Ser. No. 09/362,617, "System, Program, and Method for Performing Contextual Translations", and application Ser. No. 09/362,618, "System, Program, And Method For Software Translation Using a Wrapper Class", which are hereby incorporated by reference.

BACKGROUND OF THE INVENTION

1. Technical Field

The present invention generally relates to tools for developing software for international use and in particular to multi-language software development. Still more particularly, the present invention relates to an improved system and method for performing language translation in computer software.

2. Description of the Related Art

Software Internationalization

As computers have become more prevalent, it has become desirable for software developers to be able to market their products to those people who do not speak the native language of the software developers. In particular, it is desirable that software developed in the English language be available to those persons, both in the United States and in the rest of the world, that do not speak English. Accordingly, many software applications that are developed in English are later translated for use by non-English speakers.

The process of translating a software package into another (or more than one other) language is time-consuming and expensive. Each text message, menu, and button must be translated to allow the user to operate the program. The most direct way to do this is to search the entire program source code for every text string, i.e., every string of characters that would be displayed to the user, and translating each of these to the new language.

This approach has several problems. One problem is that the use of this method means that the software must be specifically translated and compiled for each intended language. This, of course, is an expensive process in itself, and means that any change in the source code requires each language version of the code to be edited and recompiled.

FIG. 2 shows an example of hardcoded labels in a Java application. In this Figure, window 200 shown with two graphical user interface (GUI) "buttons" 210 and 230. These buttons are created using a hard-coded Java "JButton" call; for example, code-line 220 calls JButton with the string argument "Ok", creating button 210 with text label "Ok". Similarly, code-line 240 calls JButton with the string argument "Cancel", creating button 230 with text label "Cancel". To translate a software application which uses hard-coded strings as in FIG. 2, each line of the code must be parsed and each displayed string must be individually translated for each target language.

One solution to this problem is the use of separate localization files, in which the text strings that are to be displayed are stored separately from the executable code itself. As the software is executed, the text for every given display screen is simply read from the localization files, in whichever language is stored in the file. In this manner, the text in the localization file can be translated without disturbing the executable, and the executable can be changed or replaced without disturbing the translated text (except, of course, that if the text to be displayed changes, the corresponding entries in the localization files must also be changed). The localization files may be in any number of formats, including compiled message catalogs, Java resource bundles, HTML files, and many others.

The use of localization files provides an easy way to do multiple translations, but presents an additional problem in that the translation is performed on text isolated in a separate file, without any kind of context for the translator. Because this is the case, the translation will often contain errors which would not be present if the translator had been able to perform the translation according to the context in which the text appears.

However the translation is handled, each screen of the program in operation must then be proofread to ensure that the translated text is properly displayed and properly translates the text in the context of the display. Therefore, it has become common practice to hire individuals with backgrounds in other languages to proofread each screen of the translated program to detect any display, grammar, or other translation errors. This second phase is called Translation Verification Testing (TVT).

FIG. 3 shows a chart of a translation and testing cycle according to conventional methods. A typical Company A, located in Country A, builds the application intended for Country B (310). Next, Company A packages and ships the application to Company B, located in Country B (320). Company B will then execute the application to test for any translation or internationalization errors (330). Company B will then do TVT testing, note any translation errors, and make any necessary retranslations (340). Company B then ships the corrections back to company A, and the process repeats until no more errors are found.

According to this conventional process, each time an error is corrected or a change made in translation in Country B, the product must be rebuilt and repackaged in Country A before it is retested. Because of this, the TVT process is necessarily an expensive and time-consuming process. It would therefore be desirable to provide a means to provide additional information to the translator, and contextual information in particular, so that the initial translation is as accurate as possible. By doing so, the cost and time required for TVT testing can be reduced or eliminated.

Java

Java is two things: a programming language and a platform. In one aspect, Java is a high-level programming language, and is unusual in that each Java program is both compiled and interpreted, to make it accessible to many platforms. Java is also a software-only platform that runs on top of other, hardware-based platforms. The Java platform has two components; the Java Virtual Machine (Java VM), and the Java Application Programming Interface (Java API).

The Java VM is the base for the Java platform and is ported onto various hardware-based platforms. The Java API is a large collection of ready-made software components that provide many useful capabilities, such as graphical user interface (GUI) widgets. The Java API is grouped into libraries (packages) of related components.

JavaBeans brings component technology to the Java platform. JavaBeans API supports reuseable, platform-independent components. Using JavaBeans-compliant application builder tools, components can be combined into applets, applications, or composite components. JavaBean components are known as Beans.

SUMMARY OF THE INVENTION

It is therefore one object of the present invention to provide an improved tool for developing software for international use.

It is another object of the present invention to provide an improved tool for multi-language software development.

It is yet another object of the present invention to provide an improved system and method for performing language translation in computer software.

The above as well as additional objectives, features, and advantages of the present invention will become apparent in the following detailed written description.

A more efficient translation process is made possible by providing a system, method, and program for providing language translators with contextual information for the text to be translated. The translator is presented with a graphical user interface in the base language, can can then interactively translate each text label on the screen. Because the translation is performed on the text in the proper context, the time and expense of Translation Verification Testing is reduced or eliminated. The ability to edit the text within the application is achieved by adding an editor function to the software application itself. Each text label in the application is stored in a localization file with a specific resource bundle name and by a key. When the editor is activated, the text object is introspected for its source data, and the translator can edit the text directly. The source data is then used to store the translation for later use.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 5 depicts an example of a GUI display using Java resource files, in accordance with a preferred embodiment of the invention;

DETAILED DESCRIPTION OF THE PREFERRED EMBODIMENT

Figure 1:
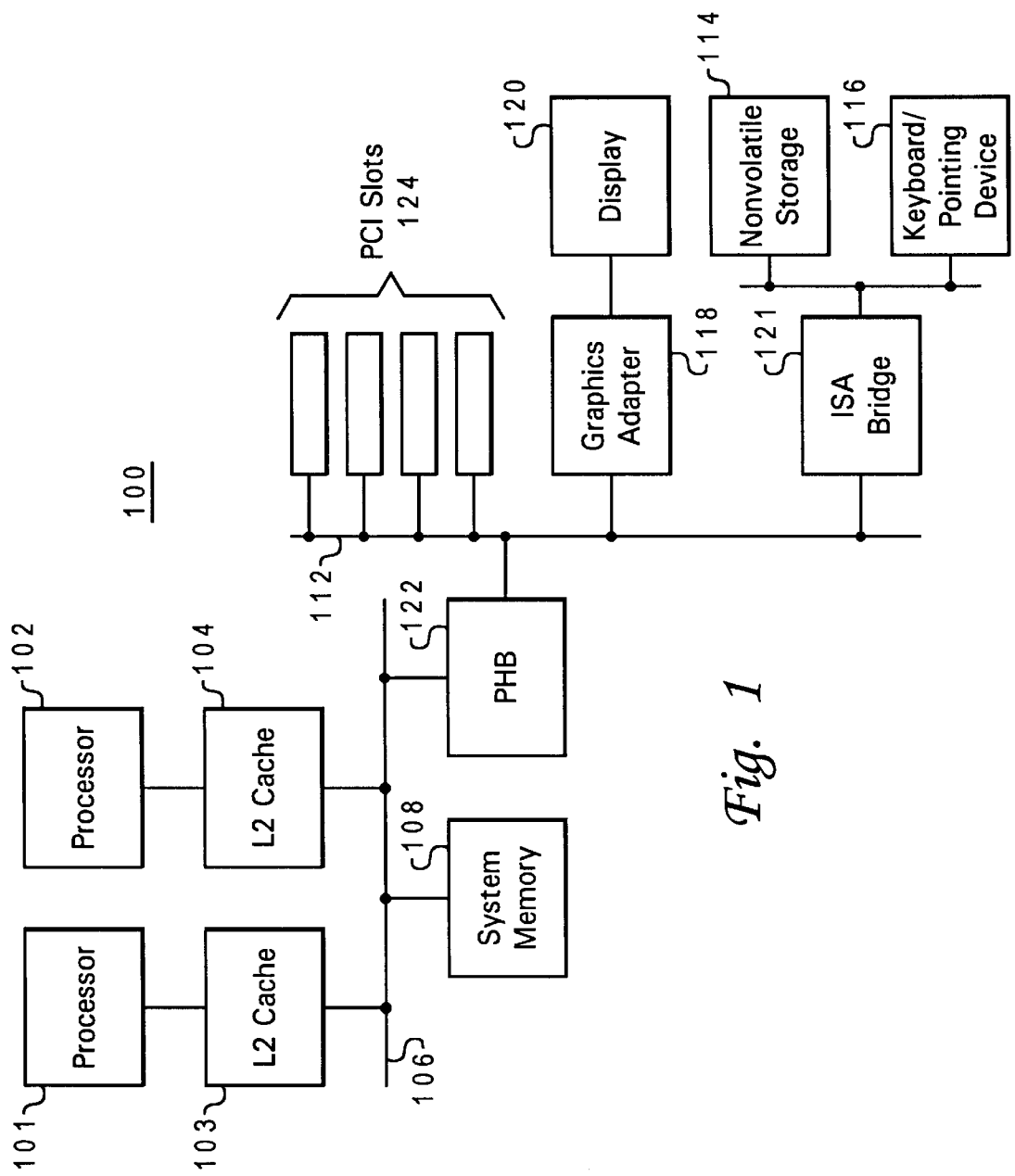
FIG. 1 depicts a data processing system in which a system in accordance with a preferred embodiment of the present invention may be implemented.

With reference now to the figures, and in particular with reference to FIG. 1, a block diagram of a data processing system in which a preferred embodiment of the present invention may be implemented is depicted. Data processing system 100 may be, for example, one of the computers available from International Business Machines Corporation of Armonk, New York. Data processing system 100 includes processors 101 and 102, which in the exemplary embodiment are each connected to level two (L2) caches 103 and 104, respectively, which are connected in turn to a system bus 106.

Also connected to system bus 106 is system memory 108 and Primary Host Bridge (PHB) 122. PHB 122 couples I/O bus 112 to system bus 106, relaying and/or transforming data transactions from one bus to the other. In the exemplary embodiment, data processing system 100 includes graphics adapter 118 connected to I/O bus 112, receiving user interface information for display 120. Peripheral devices such as nonvolatile storage 114, which may be a hard disk drive, and keyboard/pointing device 116, which may include a conventional mouse, a trackball, or the like, are connected via an Industry Standard Architecture (ISA) bridge 121 to I/O bus 112. PHB 122 is also connected to PCI slots 124 via I/O bus 112.

The exemplary embodiment shown in FIG. 1 is provided solely for the purposes of explaining the invention and those skilled in the art will recognize that numerous variations are possible, both in form and function. For instance, data processing system 100 might also include a compact disk read-only memory (CD-ROM) or digital video disk (DVD) drive, a sound card and audio speakers, and numerous other optional components. All such variations are believed to be within the spirit and scope of the present invention. Data processing system 100 and the exemplary figures below are provided solely as examples for the purposes of explanation and are not intended to imply architectural limitations. In fact, this method and system can be easily adapted for use on any programmable computer system, or network of systems, on which software applications can be executed.

A typical translation process for a software application is comprised of two phases. In the first phase, the human language text for the application's human text elements are captured in text files and delivered to translators for translation. These translators have not seen the application and thus have no contextual information about the actual usage of the text being translated. Thus the translation process is, by design, error prone. To resolve these errors and to validate the translated text, the second phase, Translation Verification Testing, is performed.

The preferred embodiment simplifies the translation process by allowing the developer to merge the two phases of the translation process. This is accomplished by providing the translator with direct contextual information about the item being translated. As a result, the costly and time-consuming TVT phase can be reduced or eliminated.

According to the preferred embodiment, an introspective editor is provided which allows direct editing of the interface components by a translator, saving the results of the translation in a text file, which, in the preferred embodiment, is a Java resource bundle. This provides the translator with necessary context to perform an accurate translation, and so the translation can be much more accurate.

Figure 3:
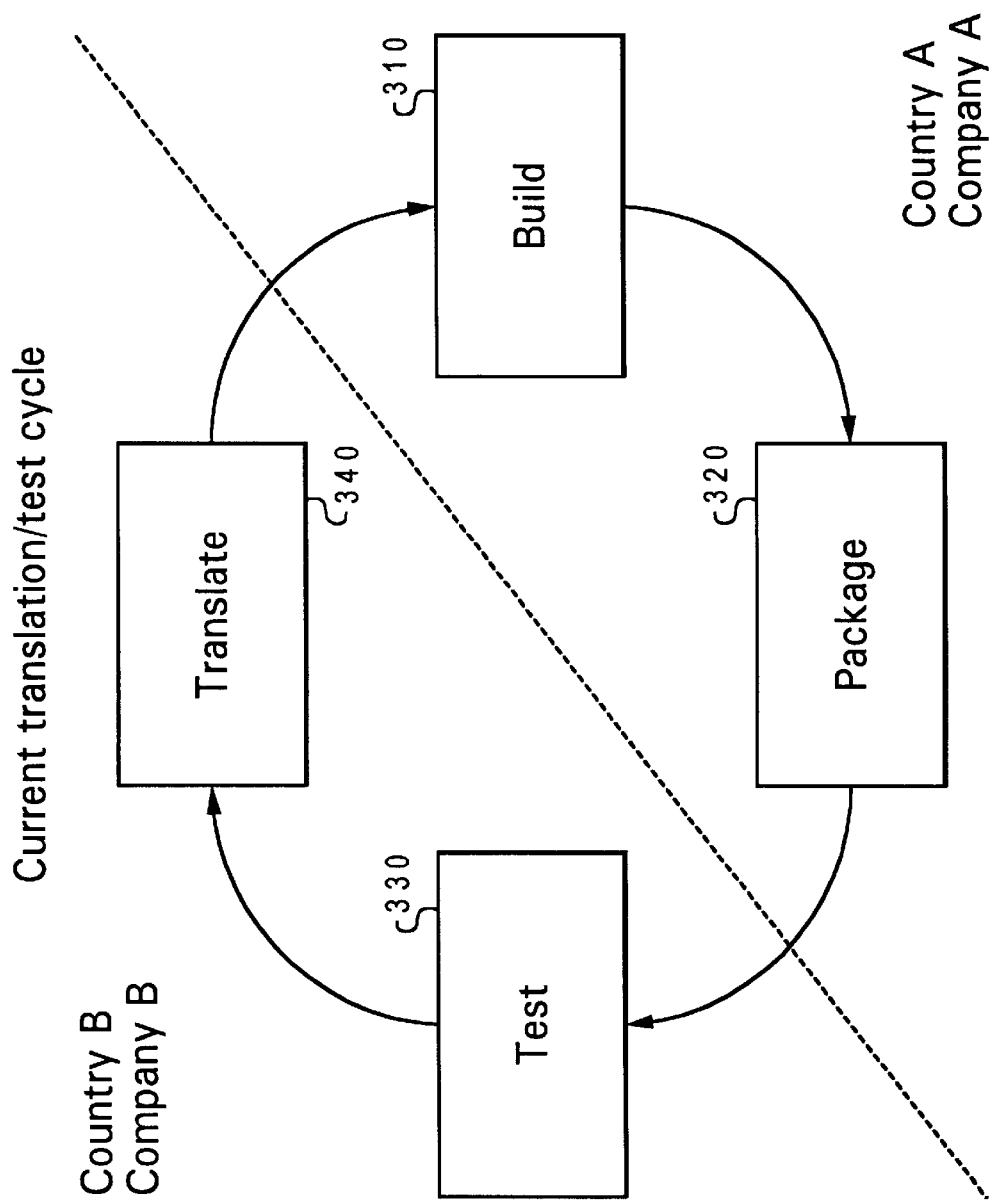
FIG. 3 depicts a block diagram of a translation and testing process according to conventional methods.
Figure 4:
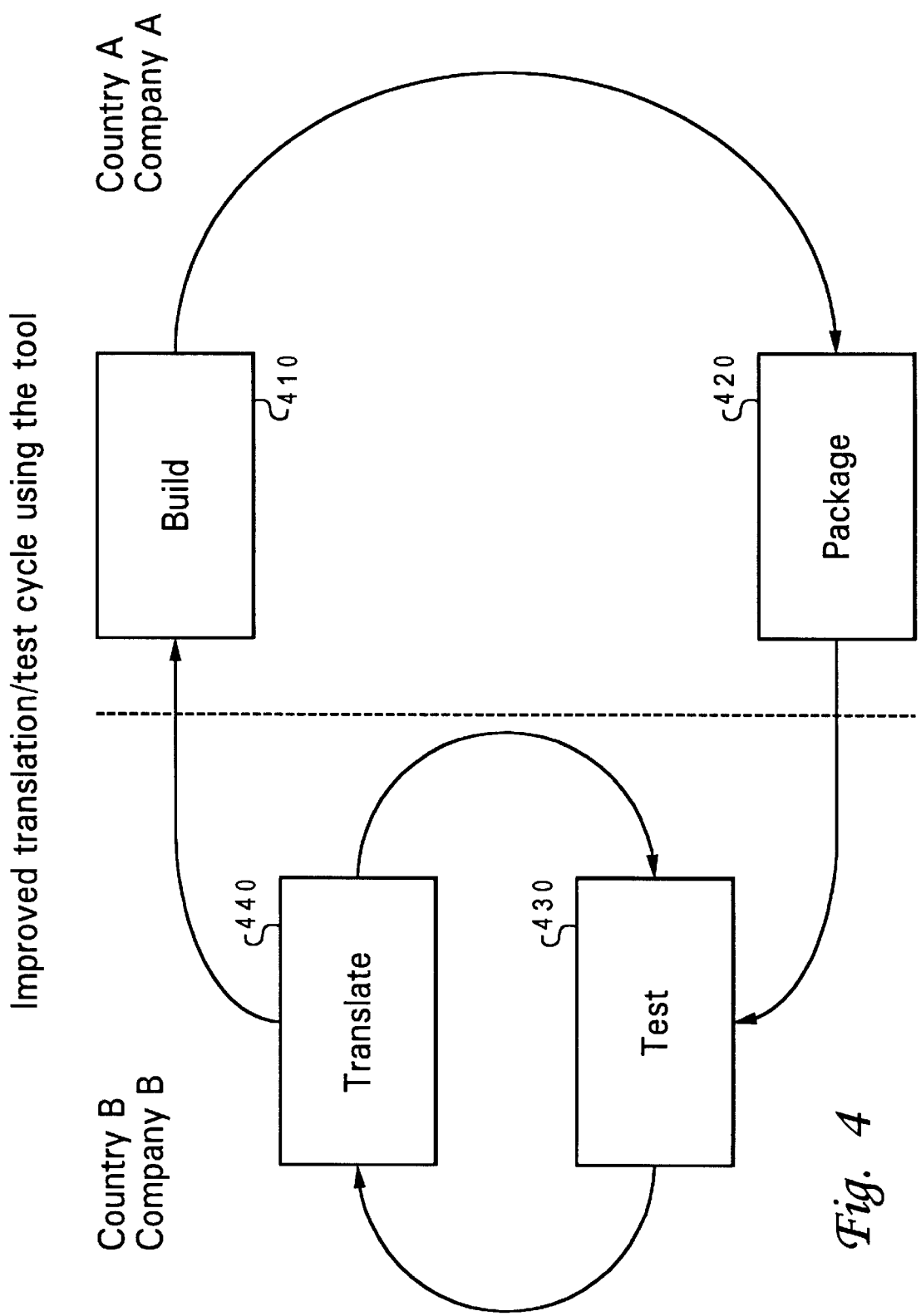
FIG. 4 is a block diagram of a translation and testing process in accordance with a preferred embodiment of the invention.

With reference now to FIG. 4, a block diagram of an improved translation and testing process according to the preferred embodiment. Company A, located in Country A, builds the application intended for Country B (410). Next, Company A packages and ships the application to Company B, located in Country B (420). Company B will then execute the application to test for any translation or internationalization errors (430). Company B will then do TVT testing, note any translation errors, and make any necessary retranslation (440). Unlike the case described in FIG. 3, above, because the present embodiments allow the translations to be performed in context and stored locally, Company B can immediately retest the translations (430), without shipping the product back to Country A to rebuild first. As a result, the translation and testing phase is much more efficient than according to conventional means.

Of course, it is possible that the testing phase in Country B will reveal other errors, such as programming problems, which are not corrected in the translation problems. In this case, the application is shipped back to Company A to be corrected, as in conventional processes.

In accordance with several embodiments described herein, the translator will actually execute the software application which he is translating, and the disclosed embodiments provide means for the translator to directly select text from the screen and edit it in real time. Because the translator is actually seeing the application as the end-user will, the translations will be much more accurate.

In use, the introspective editor, according to the preferred embodiment, is presented as a "pop-up" editor window to accompany the text to be translated. When the text is to be translated, the Java component related to the text is introspected to determine its source data, such as resource bundle name and key. When the translator selects the text, an editor pop-up window is displayed, and the translator will enter the translated text for that button. The editor will close, and the translated text will be stored in a localization file, which is either in a new file or by overwriting the original text in the original file. Thus, the complete translation has been performed in the context in which the button will appear in the final application.

In the preferred embodiment, a "ctrl-alt-shift" key combination is used to signify that the displayed text is to be translated. When the GUI window is displayed, by pressing "ctrl-alt-shift" and "right-clicking," with a mouse or other pointing device, on a text label in the display, the translator indicates that the text label is to be translated. An editor window opens, and the translator can enter new text directly into the editor window. When the translator is finished, the new text is stored for future use.

By directly editing the text elements in the software application's user interface, and by providing context to the translators, this method can eliminate the TVT phase of the translation process, thus reducing time and errors.

The editor is referred to as an "introspective" editor because, in this embodiment, it utilizes the introspection properties of the Java programming language to view and edit controls with "setText" and "getText" methods. While some aspects of Java, JavaScript, JavaBeans, and other Java-related tools are described herein, other material is available from Sun Microsystems, and can be found (as of the filing date of this application) at http://java.sun.com.

Each Java Bean component has its own features, including its properties, methods, and events. These features can be examined by other Beans by a process known as introspection. Beans support introspection in two ways:

2 By adhering to specific rules, known as design patterns, when naming Bean features. The java.beans.Introspector class examines Beans for these design patterns to discover Bean features. The Introspector class relies on the core reflection API; and 3 By explicitly providing property, method, and event information with a related Bean Information class. A Bean information class implements the BeanInfo interface. A BeanInfo class explicitly lists those Bean features that are to be exposed to application builder tools.

Properties are a Bean's appearance and behavior characteristics that can be changed at design time. Builder tools introspect on a Bean to discover its properties, and expose those properties for manipulation.

Beans expose properties so they can be customized at design time. Customization is supported in two ways: By using property editors, or by using more sophisticated Bean customizes. Beans use events to communicate with other Beans. A Bean that wants to receive events (a listener Bean) registers its interest with the Bean that fires the event (a source Bean). Builder tools can examine a Bean and determine which events that Bean can fire (send) and which it can handle (receive).

Persistence enables Beans to save and restore their state. Once you've changed a Beans properties, you can save the state of the Bean and restore that Bean at a later time, property changes intact. JavaBeans uses Java Object Serialization to support persistence.

A Bean's methods are no different than Java methods, and can be called from other Beans or a scripting environment.

Although Beans are designed to be understood by builder tools, all key APIs, including support for events, properties, and persistence, have been designed to be easily read and understood by human programmers as well.

The Introspector class provides a standard way for tools to learn about the properties, events, and methods supported by a target Java Bean. For each of those three kinds of information, the Introspector will separately analyze the bean's class and superclasses looking for either explicit or implicit information and use that information to build a BeanInfo object that comprehensively describes the target Introspective Editor for Translation The preferred embodiment provides a means to use class field values to allow the translation of software text. Each text label in a software display is stored as a class object.

Figure 2:
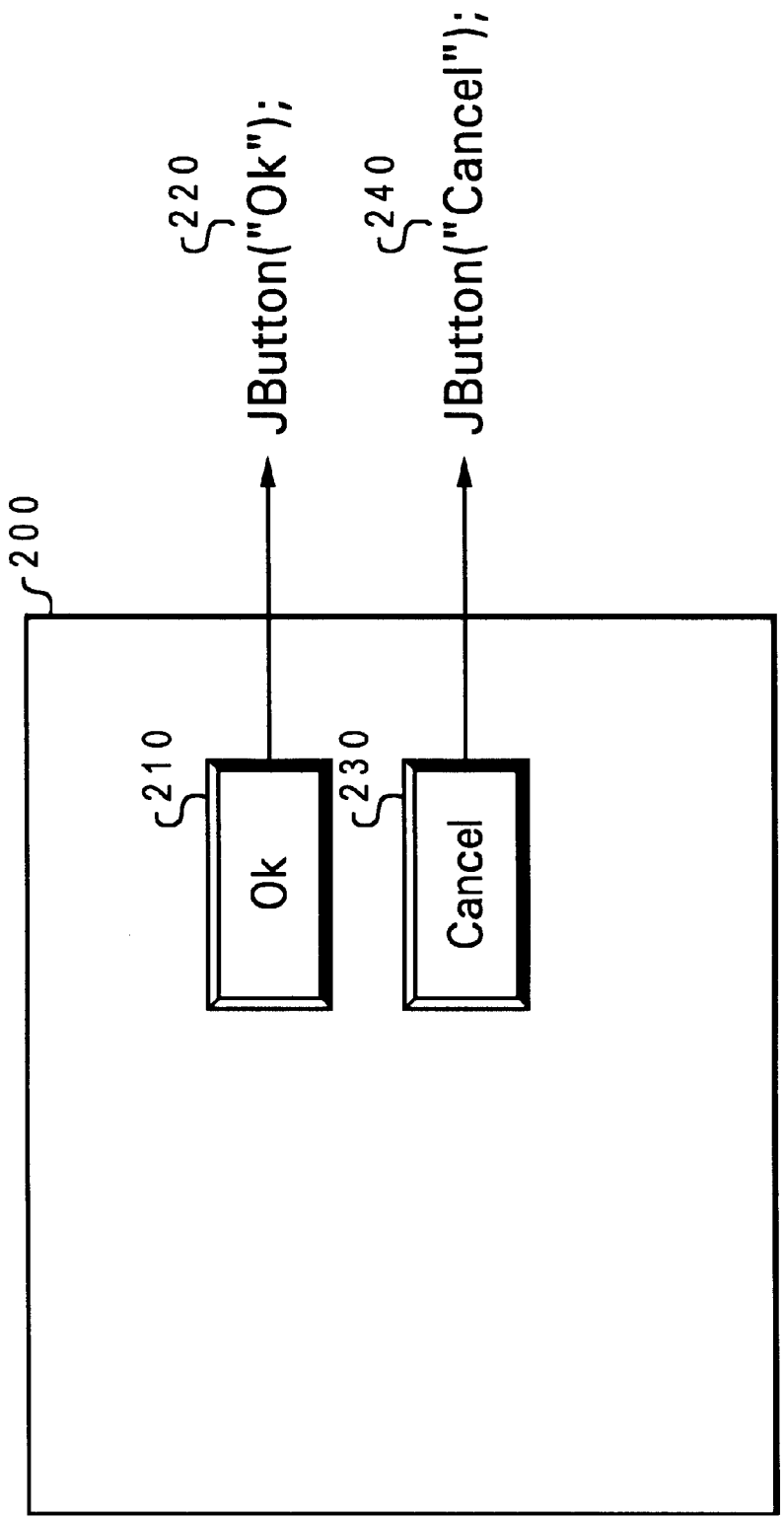
FIG. 2 is an example of a GUI display with hard-coded text.

In this embodiment, the actual text to be displayed on, for example, a GUI button, is not hard-coded but is stored in a Java ResourceBundle localization file. With reference now to FIG. 5, and example of button labels being displayed using Java resource bundles is shown. In this Figure, window 500 is shown with GUI buttons 510 and 530. Note that this window corresponds to window 200 of FIG. 2. Here, however, button 510 is created using a Java JButton call 520 which refers to a ResourceBundle.

In this example, the command "JButton(res.getString ("OK")) 540 creates a GUI button, and labels it by doing a resource file lookup for the text that should correspond to an "OK" button. Java resource files are depicted collectively as 550, and an English language reference file is shown as 560. In file 560, entry 580 indicates that the text that corresponds to an "OK" button is "Ok". Therefore, command 520 creates a GUI button with the text "Ok". Note that in this example, for the sake of clarity, button names are shown in upper case, and button text labels are shown in mixed case.

Similarly, the command "JButton(res.getString ("CANCEL")) 540 creates a GUI button, and labels it by doing a resource file lookup for the text that should correspond to an "CANCEL" button. In file 560, entry 570 indicates that the text that corresponds to an "CANCEL"

button is "Cancel". Therefore, command 520 creates a GUI button 530 with the text "Cancel". Of course, the actual corresponding text in the resource file 560 can be anything; the entry 570 could read {"CANCEL", "Stop"}, which would cause a button labeled "Stop" to be created every time command 540 was executed. Of course, this approach is not limited to GUI buttons, but may be used to look up any displayable text from the localization resource files.

Since the resource files store the text to be displayed as Java objects, the introspective properties of the Java environment can be used to allow the translators to directly edit the application text using a pop-up editor.

When the pop-up editor is activated, a getText call is made to the target object, which returns the present text to the editor. This text is displayed to the translator, who then may edit it. After the translation/edit is complete, the new text is stored in the object using a setText call.

Finally, the object, with the new text, is stored back into a Java ResourceBundle file. Thereafter, the software application can be executed using the modified objects, which will then show the translated text on the display.

Figure 6:
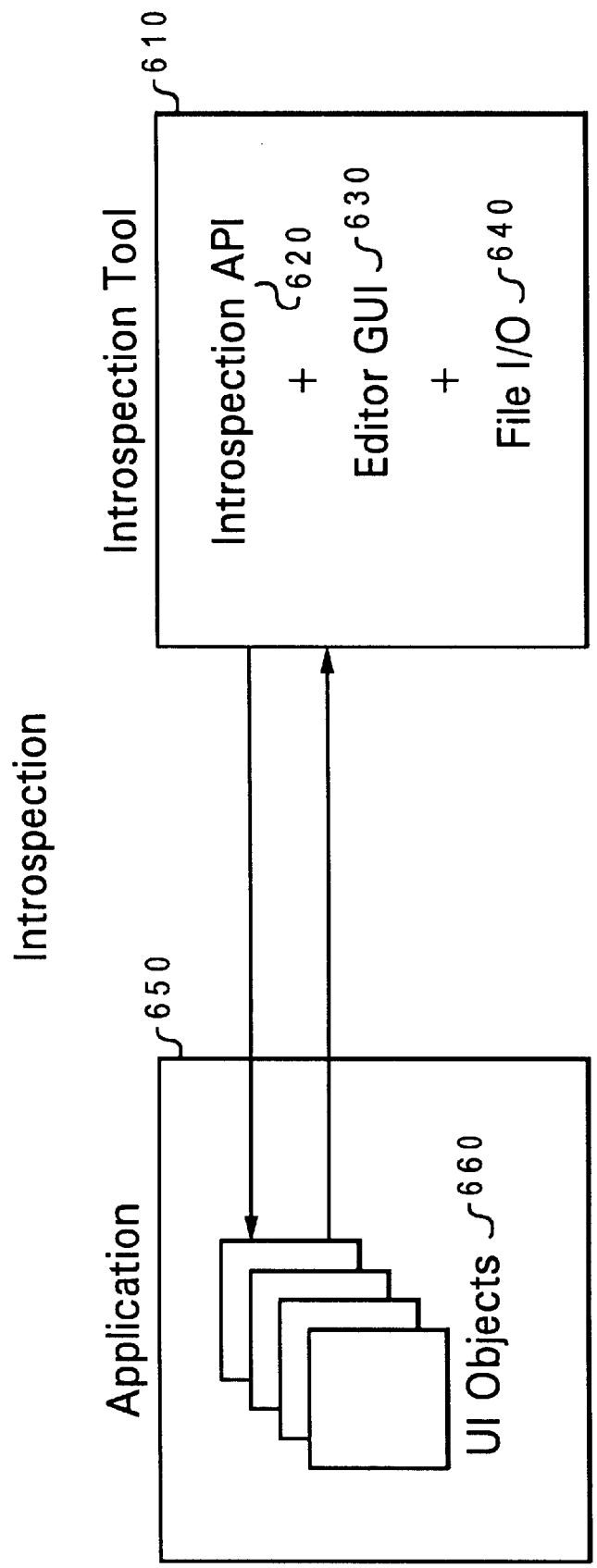
FIG. 6 is a block diagram of an introspection tool for a software application in accordance with a preferred embodiment of the invention.

With reference now to FIG. 6, it should be noted that, in this embodiment, the introspective editor 610 is a separate software program than the application 650 that is being translated. The editor 610 contains the code for the Introspection Application Programming Interface (API) 620, the Editor GUI 630, and the File I/O system 640. The target application 650 stores the UI Objects 660, which contain the text strings to be translated, in Java resource files.

The translator is, in this embodiment, simultaneously running the target application 650 and the introspective editor 610. When the pop-up editor is used, the introspective editor is retrieving and storing the objects from the target application 650.

Java Wrapper API

Another implementation accomplishes the same contextual-translation results described above, but uses "wrapper" classes of Java UI classes. Java wrapper classes allow the programmer to "wrap" a Java component into a new component, which has all the attributes of the original component plus one or more new or expanded attributes.

This embodiment extends Java Swing components such as JButton to store a resource bundle name attribute and a key name attribute in the instance objects. The extended components implement constructors with these attributes and get/set methods. Those attributes can be displayed in a popup dialog on those components and users can edit the label at run time. The changes made in the popup dialog is directly reflected to the application UI component and saved in a log file.

In a large application, the same text (such as "Save") might be defined in several resource files, and different dialogs could be using different resource files for the same label.

If a translator found that a label "Save," for example, must be replaced in a given dialog with another word such as "Store," but the other dialogs are to remain as "Save", the translator must know which resource file is actually used to display that label. Translators usually have access to the resource files but not to the program source, where the association of the GUI component and resource files is provided. The translator is forced to guess at which resource file is being used, which is a very inefficient, time consuming and error prone step.

This embodiment provides a means to let the translator IN know which resource file and which key is used for the particular GUI label. To accomplish this, resource file name and key name must be added to the instance of GUI component as well as the label itself, using a Java wrapper class. Once this information is stored in the GUI components, the tool can display the resource name and key to the translator to be edited, or tool can even edit the resource file for the translator using the editor interface provided by the tool.

The wrapper extends the Java class in two ways. One is to add two string attributes to store resource file name and key, and the other is to provide the constructors and methods to set/get those attributes. The constructors and methods of wrappers are very similar to those of the parent classes. "setText/getText" is used to set and get the label of the text based component, which is always a text entry. Even if the program writes setText(getKey( . . . )), the label is just resolved text, and does not contain resource file name and key.

This embodiment, using Java wrapper classes, has two advantages over the embodiment described above, which relies only on the getText/setText method:

The wrapper can store resource file name and key, whereas setText only stores the label.

The wrapper's constructors sets resource file name and key as well as the label. Without wrappers, developer is required to call another method to set them whenever he instantiates the GUI component with label, and this step is frequently overlooked in development.

Figure 7:
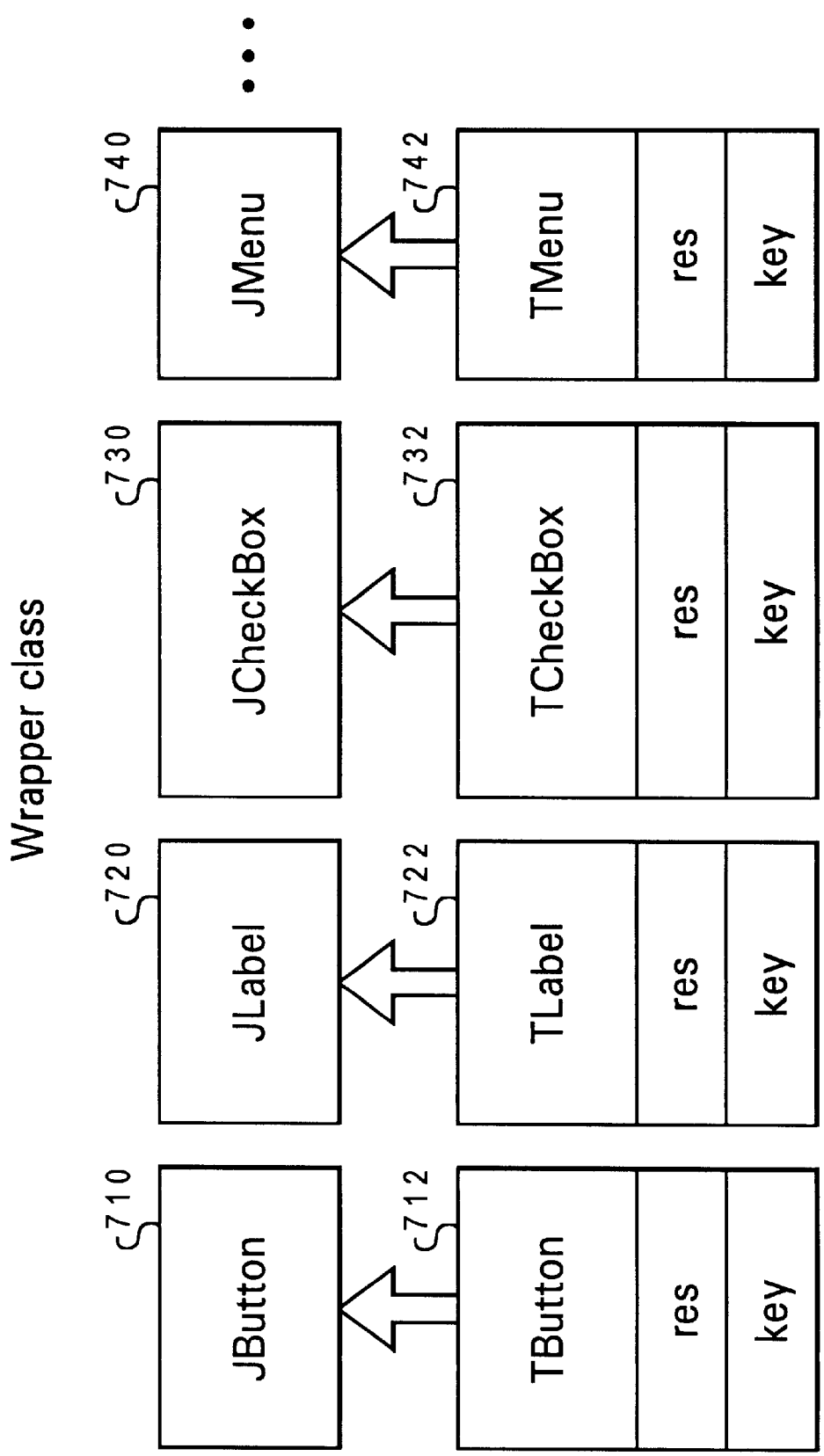
FIG. 7 depicts a block diagram of a Java wrapper class in accordance with a preferred embodiment of the invention.

As shown in FIG. 7, this embodiment extends the Java Foundation Class's text components, such as JButton 710, Jlabel 720, JCheckBox 730, and JMenu 740, to produce corresponding components TButton 712, Tlabel 722, JCheckBox 732, and JMenu 742; of course, other JFC components can be similarly expanded. The new components add a get/set method for the resource bundle name (res) and key, for each component.

Figure 8:
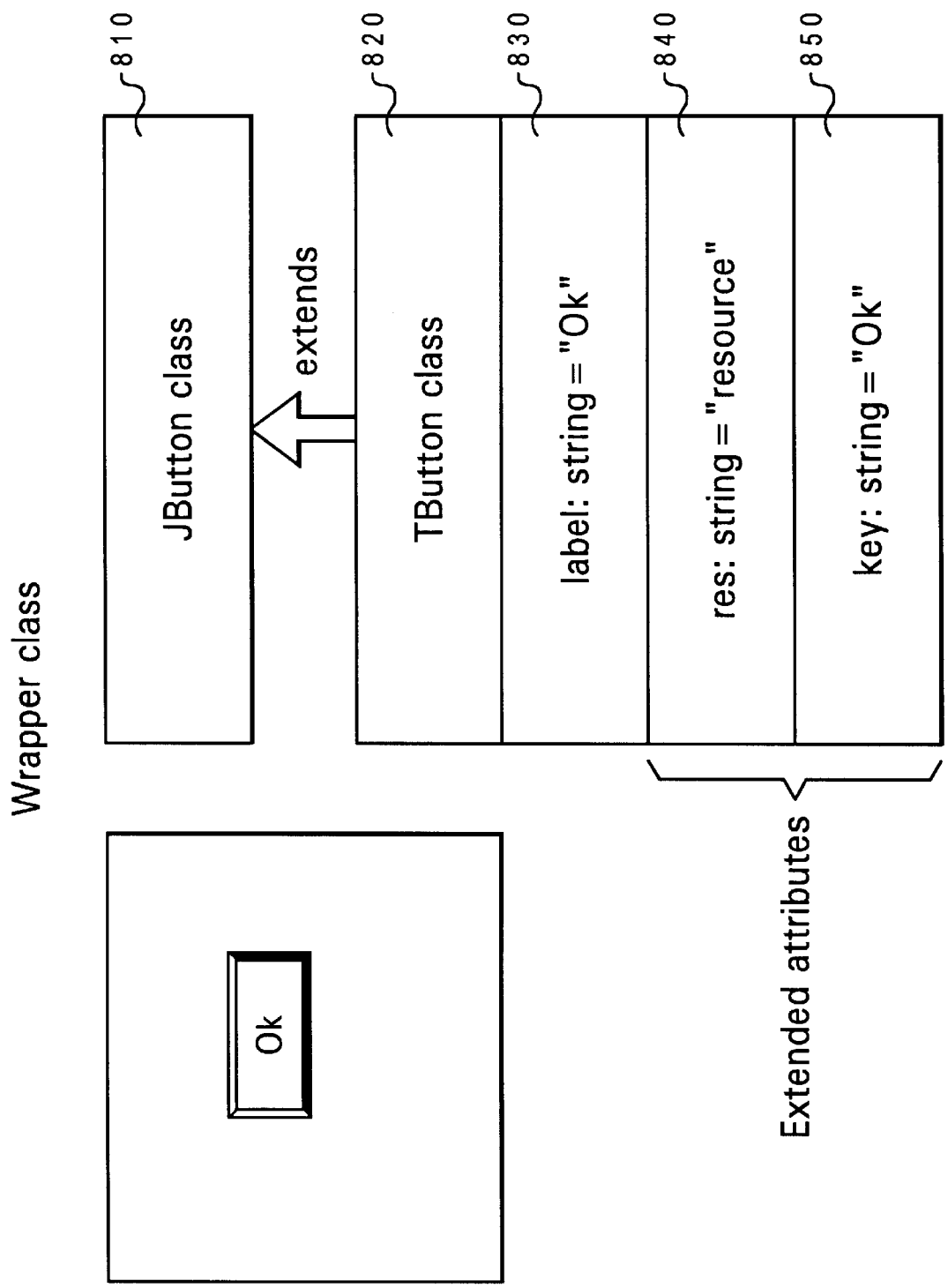
FIG. 8 is a more detailed diagram of a Java wrapper class in accordance with a preferred embodiment of the invention.

With reference now to FIG. 8, a more detailed diagram of the component expansion for the "JButton" class is shown. In this Figure, JButton class 810 is extended, using a Java wrapper API, to a TButton class 820. The TButton class has the same "label" attribute 830 as the original JButton class, but adds attributes for the resource bundle name (res) 840 and the key 850. These allow the translator to directly bring up and edit the label attribute of each TButton, according to its key.

Using this approach, the translator can bring up a popup menu on those components and directly edit/translate the label at run time. The changes to the labels are saved in a log file, according to the class and key, and also immediately changed on the GUI display. Thereafter, when the software application encounters this class and key, the edited/translated text is displayed.

It should be noted that this embodiment, unlike the introspection tool above, uses wrapper classes that are a part of the software application being translated. If the software application to be translated does not support the extended wrapper classes, this approach will not be effective.

Facade

Another embodiment provides for attaching the per-component translation information to a JComponent by creating a "facade" class. In this embodiment, the access methods and editor user interface logic are centralized into a single "facade" class instead of having those in each wrapper classes.

The application sets the resource bundle name and key name of the Java UI component through this facade class. Those attributes can be displayed in a popup dialog on those components and users can edit the label at run time. The changes made in the popup dialog is directly reflected to the application UI component and saved in a log file.

This method solves the same problem as the wrapping approach above. The advantages of this approach over wrappering are:
  (1) Subclassing in the wrappering approach has a maintenance overhead (new and updated JComponents require changes to the set of derived components),
  (2) Wrappering incurs a development overhead, in that designers are required to choose only from the set of available subclasses, or to implement their own,
  (3) Wrappering also incurs a runtime overhead, since the editor attribute must be built into each component), and
  (4) The setName( ) used in the wrappering embodiment involves combining all translation attributes into the component's "name" attribute, whereas the properties-based approach provides direct access to each translation attribute, is more readily expandable (e.g. for tooltip text translation attributes), and leaves the component's "name" attribute available for other uses.

This embodiment provides the class "NLSUtility," which works as a facade to JFC text components (JButton, JLabel, JCheckBox, JRadioButton) and implements a get/set method for the resource bundle name and key. Those attributes are stored in a clientProperty hash table with access key. The user can bring up a popup menu on those components and edit the label at run time. The changes to the labels are saved in a log file.

Figure 9:
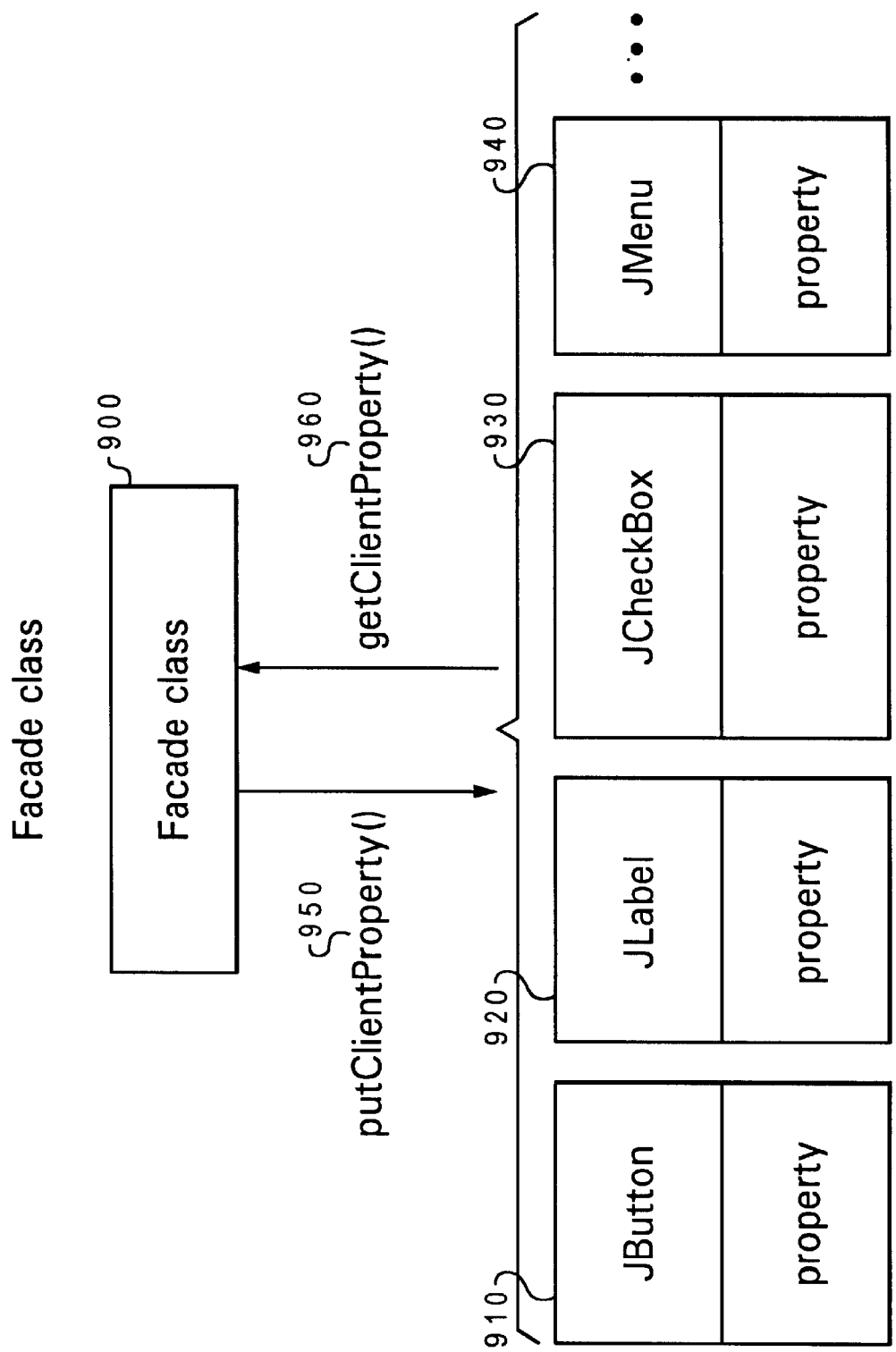
FIG. 9 depicts a block diagram of a Java facade class in accordance with a preferred embodiment of the invention.

FIG. 9 shows a block diagram according to this facade class embodiment. Here, facade class 900 acts as a front end to the JFC text components 910, 920, 930 940 (and others, not shown), and associates with each of these a client property attribute. The facade class can then be used to directly read and edit the property attributes of the underlying JFC foundation classes, by using putClientProperty( ) 950 and getClientProperty( ) 960. By using the facade class, the same results as the wrappering embodiment, above, are achieved, but the overhead of the editor function is built into the facade class, instead of into each individual component.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to several preferred embodiments, it will be understood by those skilled in the art that various changes in form and detail may be made therein without departing from the spirit and scope of the invention. Furthermore, it will be understood that while specific data structures, functions, and languages have been discussed, the disclosed techniques may be readily adapted to other programming environments without departing from the scope of the invention.

What is claimed is:

1. A method for editing textual data for a software program, comprising:
  displaying a user interface containing a first textual data within a non-data, user interaction portion of the user interface;
  responsive to selection of the first textual data within the displayed user interface by a user for editing, introspecting source code for generating the user interface to identify a software object that includes the first textual data;
  receiving a second textual data which the user desires to replace the first textual data from a user input while the user interface is being displayed;
  storing the second textual data in a machine-readable form within the software object in place of the first textual data; and
  during execution of the source code for generating the user interface display after storing the second textual string within the software object, displaying the second textual data in place of the first textual data within the user interface.

2. The method of claim 1, wherein the software object is a localization file on a computer storage medium.

3. The method of claim 1, wherein the second textual data is a translation of the first textual data from a first human language to a second human language.

4. The method of claim 1, wherein the software object is a Java component.

5. The method of claim 1, wherein the source code for generating the user interface includes a reference to a Java resource bundle.

6. The method of claim 1, wherein the source code for generating the user interface includes a key associated with the first textual data, wherein the second textual data is associated with the key in replacing the first textual data.

7. The method of claim 1, wherein the user selects the first textual data within the displayed user interface for editing by a mouse click.

8. A computer system having at least a processor, accessible memory, and an accessible display, the computer system comprising:
  means for displaying a user interface containing a first textual data within a non-data, user interaction portion of the user interface;
  means, responsive to selection of the first textual data within the displayed user interface by a user for editing, for introspecting source code for generating the user interface to identify a software object that includes the first textual data;
  means for receiving a second textual data which the user desires to replace the first textual data from a user input while the user interface is being displayed;
  means for storing the second textual data in a machine-readable form within the software object in place of the first textual data; and
  means, during execution of the source code for generating the user interface display after storing the second textual string within the software object, for displaying the second textual data in place of the first textual data within the user interface.

9. The system of claim 8, wherein the software object is a localization file on a computer storage medium.

10. The system of claim 8, wherein the second textual data is a translation of the first textual data from a first human language to a second human language.

11. The system of claim 8, wherein the software object is a Java component.

12. The system of claim 8, wherein the source code for generating the user interface includes a reference to a Java resource bundle.

13. The system of claim 8, wherein the source code for generating the user interface includes a key associated with the first textual data, wherein the second textual data is associated with the key in replacing the first textual data.

14. The system of claim 8, wherein the user selects the first textual data within the displayed user interface for editing by a mouse click.

15. A computer program product having computer readable program code on a computer usable medium, comprising:

instructions for displaying a user interface containing a first textual data within a non-data, user interaction portion of the user interface;

instructions, responsive to selection of the first textual data within the displayed user interface by a user for editing, for introspecting source code for generating the user interface to identify a software object that includes the first textual data;

instructions for receiving a second textual data which the user desires to replace the first textual data from a user input while the user interface is being displayed;

instructions for storing the second textual data in a machine-readable form within the software object in place of the first textual data; and instructions, during execution of the source code for generating the user interface display after storing the second textual string within the software object, for displaying the second textual data in place of the first textual data within the user interface.

16. The computer program product of claim 15, wherein the software object is a localization file on a computer storage medium.

17. The computer program product of claim 15, wherein the second textual data is a translation of the first textual data from a first human language to a second human language.

18. The computer program product of claim 15, wherein the software object is a Java component.

19. The computer program product of claim 15, wherein the source code for generating the user interface includes a reference to a Java resource bundle.

20. The computer program product of claim 15, wherein the source code for generating the user interface includes a key associated with the first textual data, wherein the second textual data is associated with the key in replacing the first textual data.

21. The computer program product of claim 15, wherein the user selects the first textual data within the displayed user interface for editing by a mouse click.

\* \* \* \* \*

UNITED STATES PATENT AND TRADEMARK OFFICE
CERTIFICATE OF CORRECTION

PATENT NO. : 6,275,790 B1
DATED : August 14, 2001
INVENTOR(S) : Yamamoto et al.

It is certified that error appears in the above-identified patent and that said Letters Patent is hereby corrected as shown below:

<u>Column 6,</u>
Line 39, please add -- bean. -- after the word "target"

Signed and Sealed this

Seventh Day of May, 2002

Attest:

JAMES E. ROGAN
*Attesting Officer*     *Director of the United States Patent and Trademark Office*